(12) United States Patent
Spagnolo

(10) Patent No.: US 11,445,850 B2
(45) Date of Patent: Sep. 20, 2022

(54) CONSTRUCTIVE ARRANGEMENT FOR SUCTION DEVICE WITH CONTAINER TO MIX YERBA MATE OR SIMILAR WITH WATER

(71) Applicant: Bruno Gambarini Spagnolo, Londrina (BR)

(72) Inventor: Bruno Gambarini Spagnolo, Londrina (BR)

( * ) Notice: Subject to any disclaimer, the term of this patent is extended or adjusted under 35 U.S.C. 154(b) by 398 days.

(21) Appl. No.: 16/604,394

(22) PCT Filed: Jan. 19, 2018

(86) PCT No.: PCT/BR2018/050009
§ 371 (c)(1),
(2) Date: Oct. 10, 2019

(87) PCT Pub. No.: WO2019/000063
PCT Pub. Date: Jan. 3, 2019

(65) Prior Publication Data
US 2020/0154931 A1 May 21, 2020

(30) Foreign Application Priority Data
Jun. 26, 2017 (BR) .......................... 2020170138203

(51) Int. Cl.
*A47J 31/18* (2006.01)
*A47J 31/46* (2006.01)
(Continued)

(52) U.S. Cl.
CPC ............. *A47J 31/18* (2013.01); *A47J 31/005* (2013.01); *A47J 31/46* (2013.01); *B65D 51/28* (2013.01)

(58) Field of Classification Search
CPC ......... A47J 31/18; A47J 31/005; B65D 51/28; B65D 2231/022; A47G 19/12;
(Continued)

(56) References Cited

U.S. PATENT DOCUMENTS

| 9,988,177 B1* | 6/2018 | Ruprecht | B65D 47/065 |
| 2010/0003379 A1* | 1/2010 | Zoss | B65D 51/247 |
| | | | 426/115 |
| 2011/0226133 A1* | 9/2011 | Shen | A47J 31/005 |
| | | | 99/316 |

FOREIGN PATENT DOCUMENTS

| CN | 201718928 U | * | 1/2011 |
| CN | 104352134 A | * | 2/2015 |

(Continued)

*Primary Examiner* — John J Norton
(74) *Attorney, Agent, or Firm* — Scott Houtteman; Houtteman Law LLC

(57) ABSTRACT

A device is disclosed for mixing with water the ingredients for yerba mate, tea, or similar beverages. The device has two connected compartments, a first sealed compartment connected to a second compartment. The first compartment is also connected to a duct on the bottom which can draw water from a common disposable bottle. The second compartment is also connected to a suction nozzle that protrudes from the top. The device is designed so that when the suction nozzle supplies suction water is drawn from the bottle through the first compartment and into the second. The beverage ingredient, such as yerba mate, is placed in the first compartment and is kept there by an input filter placed at the entrance to the first compartment and an output filter placed at the connection between the first compartment to the second compartment.

4 Claims, 4 Drawing Sheets

(51) Int. Cl.
*B65D 51/28* (2006.01)
*A47J 31/00* (2006.01)

(58) Field of Classification Search
CPC .... A47G 19/14; A47G 19/22; A47G 19/2205; A47G 19/2222; A47G 19/2255; A47G 19/2266; A47G 19/2272
See application file for complete search history.

(56) References Cited

FOREIGN PATENT DOCUMENTS

| | | | | | |
|---|---|---|---|---|---|
| CN | 109124242 | A | * | 1/2019 | ......... A47G 19/2222 |
| CN | 105775370 | B | * | 2/2019 | ......... A47G 19/2266 |
| WO | WO-2016081925 | A1 | * | 5/2016 | ............ A47J 31/005 |

* cited by examiner

CONSTRUCTIVE ARRANGEMENT FOR SUCTION DEVICE WITH CONTAINER TO MIX YERBA MATE OR SIMILAR WITH WATER

There are, today, essentially two ways of drinking yerba mate: with cold water, named tereré and chimarrão, consumed with hot water, both being quite similar. In practical terms, consumer needs a proper vessel, i.e.: guampa or cuia [typical bowls]—the former for tereré and the latter for chimarrão; a suction pump and a thermal bottle—either for cold or hot water.

This report describes constructive improvements to make it possible to consume the product from a sealed container where the product is stored and ready to be consumed by suction, from the mixture of the water coming from a disposable, common-use, PET plastic bottle, with the yerba mate, tea or similar, without the need for using utensils like a thermal bottle, a pump, a cuia or guampa, and even the yerba itself or ice.

The suction device is provided in a way to be positioned on the top of the disposable bottle with water, attached to its nozzle by threading and upon the action of an open chamber that confers balance to the system when it receives the upper part of the bottle, provided on the bottom with a suction duct connected to a valve for the suction of the water coming from the bottle to the first compartment; and, on the upper part, with a suction nozzle for the mixture of yerba mate, tea, or similar with water, following the mixture, present in the second compartment or suction antechamber, being included input and output filters, the first on the connection of the suction duct of the bottle water, the second on the inner wall of the first compartment, before the suction antechamber.

DESCRIPTION OF THE STATE OF THE ART

It is known that devices somehow connected to the dispensing of liquids for consumption by suction are rather widespread in the common practice, covering the most varied constructive solutions.

Through a prior art search, as commented below, it was possible to find documents covering several operative conceptions, out of which, excluding those whose operation follows concepts different from that of this report, the following were selected:

Brazilian patent application BR102013029396-2 A2, filed on Nov. 14, 2013, addresses an automatic opening package for a soluble product that can be coupled to bottle nozzles, comprehending a package for the soluble-powder products that can be coupled to the bottle neck through the threads of a PET bottle of water or other liquids. Out of the claim scope, it follows the inclusion of a chamber where the particulate material is stored, i.e.: specifically, soluble powder, which is supported by the extremely tiny dimensions of such chamber, and obviously designed for concentrated soluble powders.

Brazilian patent application BR112014016248-4, filed on Jun. 30, 2014, addresses a vessel for fluid comprised of an opening on the bottom surface and a connection device that can be coupled to a filling device, and the connection device is comprised of a ring that is crimped around its opening and a magnetic material whose action determines the sealing between the lid and the ring.

The claims of Brazilian patent application BR102016002431-5 A2, filed on Feb. 3, 2016, whose object is a liquid container with an inner part and a neck with an opening, a suction lid with a bottom wall, at least one continuous channel, a valve seat and support claims a cover a fluid vessel with an inner part and a neck with an opening; a suction lid with a bottom wall and at least one continuous channel with an opening to the inner part and surroundings, a valve seat and support devices. This valve is provided on the valve seat and is made of an elastic, soft material with a plate-shaped main body that blocks the continuous channel, which is opened when the main body is in a non-deformed state.

Brazilian patent application BR102016014885-5 A2, filed on Jun. 23, 2016 addresses the dispensing of a viscous or liquid product from a fluid reservoir, comprehending an actuator, a control member, a dispensing member, and a ring configured to be connected to the reservoir, as well as an extensor. According to the claim scope, more specifically to claim 5, this device comprehends at least one hole provided on the surface line that enables the product dispensing in a parallel direction to an impulse direction of the actuator. It does not include any device for mouth suction.

Once exposed the documents concerning state-of-the-art devices, it could be verified that, despite some of them having similar operative concepts to that proposed hereby, it is clear that the object claimed herein effectively covers a new form or arrangement, involving the inventive act that results in functional improvement to the use and manufacturing of the mouth-aspiration suction device, once the function of mixing water and yerba mate, tea, or similar is achieved in the sealed compartment that can be coupled to common-use, disposable bottles through a fitting and threading system.

In this regard, the plastic forming of the container follows the cylindrical shape of disposable bottles, whose nozzle is coupled by a thread system, and whose inner side is accessed by the suction duct that brings the water from the bottle to the first mixing compartment.

For example, Brazilian patent application BR102013029396-2 A2, although it anticipates the connection to bottle nozzles, it is about the specific application for soluble powder products upon the coupling to bottle necks to break the inner seal, so that the stored product can be mixed with water. It is worth mentioning that such soluble powder must also be concentrated, because of the extremely tiny dimensions of the continent chamber.

On its turn, Brazilian patent application BR112014016248-4 describes a fluid dispensing system and set that includes a connection or a coupling device, a valve, a shell, and a fitting to be coupled to a fluid source, whose sealing system between the lid and the ring is provided by a magnetic material.

Brazilian patent application BR102016002431-5 A2 proposes a container whose operation takes place by the elasticity of its components, it does not include connection to bottles or other packages, while Brazilian patent application BR102016014885-5 A2, despite addressing the dispensing of a viscous product, it does not include the connection to packages or bottles and any human consumption, especially by suction, since there is not mechanism for that purpose.

That is how the object of this report improves the state-of-the-art devices, even because, as shown in the listed documents, existing devices, in some cases, only address a mixture with concentrated powders, while in other cases, they do not include the connection to common-use packages or bottles, or their object is not a mixture for human consumption through mouth suction.

For instance, the concept proposed in Brazilian patent application BR102016002431-5 is ineffective, as its operation proposes a functional concept somehow similar to the one proposed herein, but it has limitations that the proposed one can effectively solve.

As such, the improvements proposed herein promote significant operative enhancement, firstly, because they enable the mixing with yerba mate, tea, or similar so that the user will not need a pump, cuia, thermal bottle, or any other utensils for the consumption, once the container, which stores yerba, tea, or similar, has a suction nozzle and a suction duct that brings water to the mixture.

For all that, it is clear that the proposed improvements assume the existence of precedents like those found in the state-of-the-art research, because they correspond to changes that enhance the functional aspect concerning its use and manufacturing, perfectly typifying the patent in the utility model category, once characterized a new way or arrangement involving the inventive act.

BRIEF DESCRIPTION OF THE INVENTION

Considering the pertinent remarks on the state-of-the-art devices above, the object of this descriptive report is a constructive solution that, applied to a suction device provided with a compartment for mixing yerba mate or similar with water, improves the consumption method, once it does without a specific vessel, like a chimarrão bowl, for example, a suction pump or a thermal bottle and ice, because the first mixing compartment communicates to the second compartment or suction antechamber through a filter installed to the inner part, and then to the suction nozzle by mouth aspiration, perfectly mechanizing the mixture and consumption in a single operation.

As such, there is a first sealed compartment (1), with a lid on the top (2), communicable to a second compartment (11) out of which a mouth-aspiration suction nozzle (3) protrudes.

The suction device has a suction duct on the bottom (4) that brings the water from a common-use, disposable bottle (5) to the first mixing compartment (1) through the input filter (7).

The second compartment or suction antechamber (11) has an output filter (6) installed on the inner wall (10) that configures it.

The cylindrical configuration of the suction device protrudes in the descending direction so to configure an open chamber (11), actually, the receptacle of the disposable bottle (5), balancing the entire set, in whose bottom line there is a sector (9) with a thread to fit the bottle nozzle and a fitting for the suction (4) duct.

DESCRIPTION OF THE DRAWINGS

The characterization of these improvements is made by drawings representing the proposed construction solution, so that they can be better understood.

The figures express the preferred forms to realize the conceived product and substantiate this description through numerical and consecutive remissions that clarify constructive and operative aspects that may be presumed by the adopted representation, then precisely defining this application. Such figures are merely illustrative and may have variations, since they do not change the project initially claimed.

Figure 1:
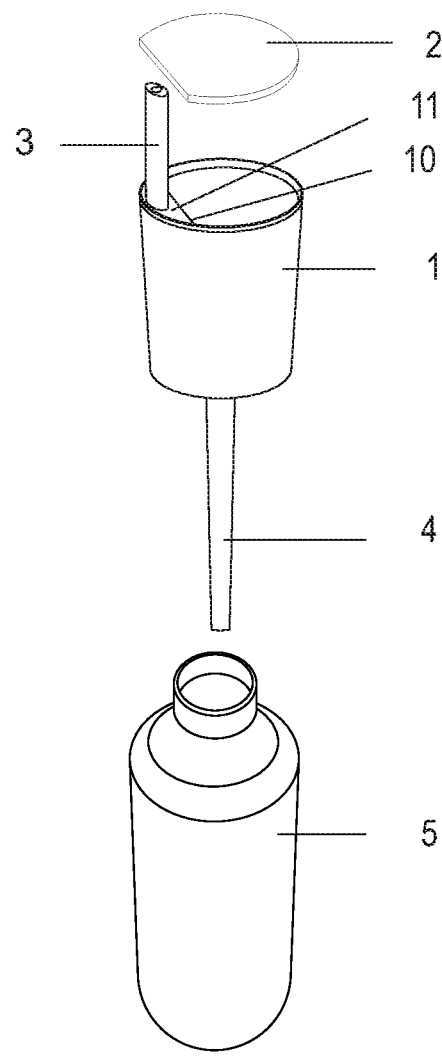

As such:

FIG. 1, in lateral orthographic projection, describes the constructive solution of the device from the first mixture compartment (1), where the lid of the upper seal (2) is precisely cut on the wall line (10) that forms the second compartment (11), or suction antechamber. This very figure enables the visualization of the mouth-aspiration suction nozzle (3), as well as the suction duct (4) that enters the common-use bottle (5) and brings the water in it to the inner side of the first mixing compartment (1), passing by the input filter (7).

Figure 2:
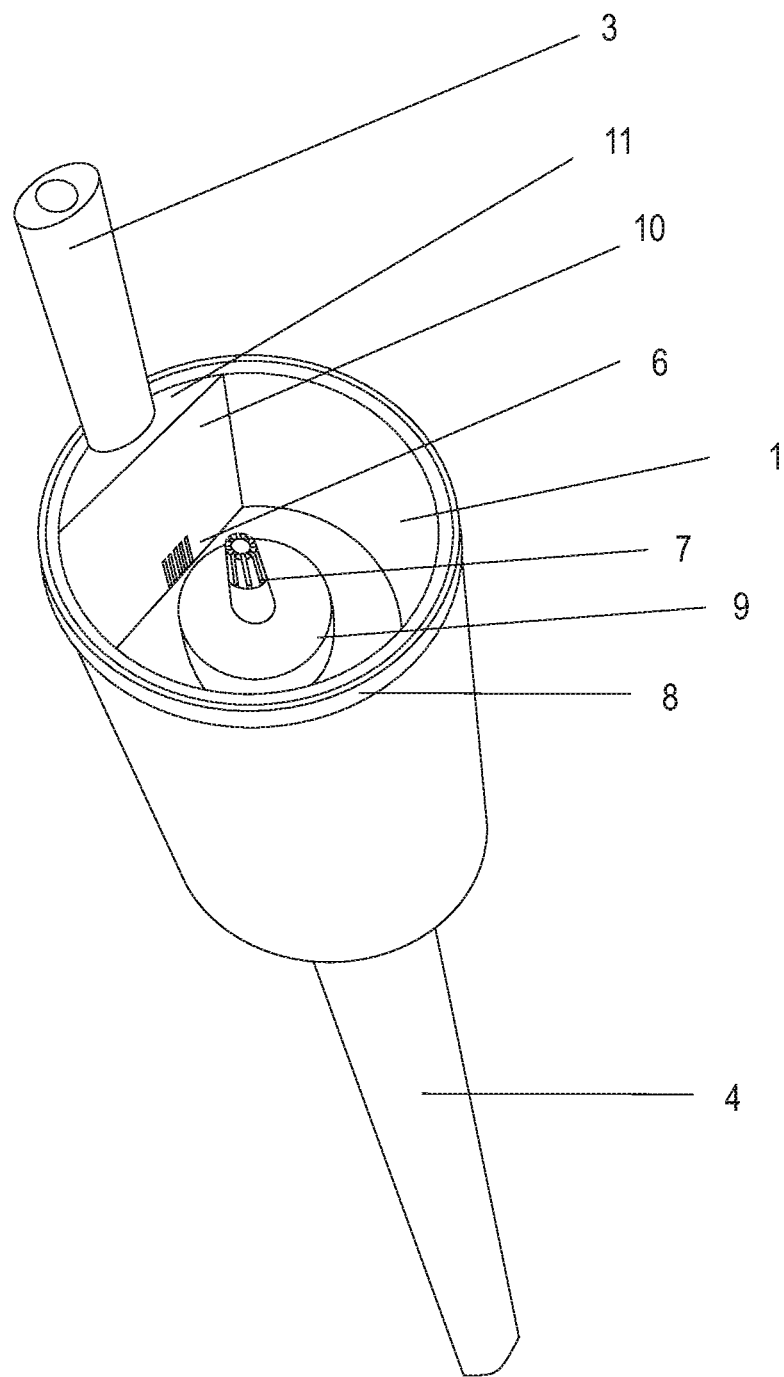

FIG. 2, in a superior anterior perspective, describes the positioning of input (7) and output (6) filters, the one provided on the upper line of the fitting (9) sector of the suction duct (4), positioning it on the bottom of the first mixing (1) compartment, this one on the wall (10) that forms the second compartment or suction antechamber (11).

Figure 3:
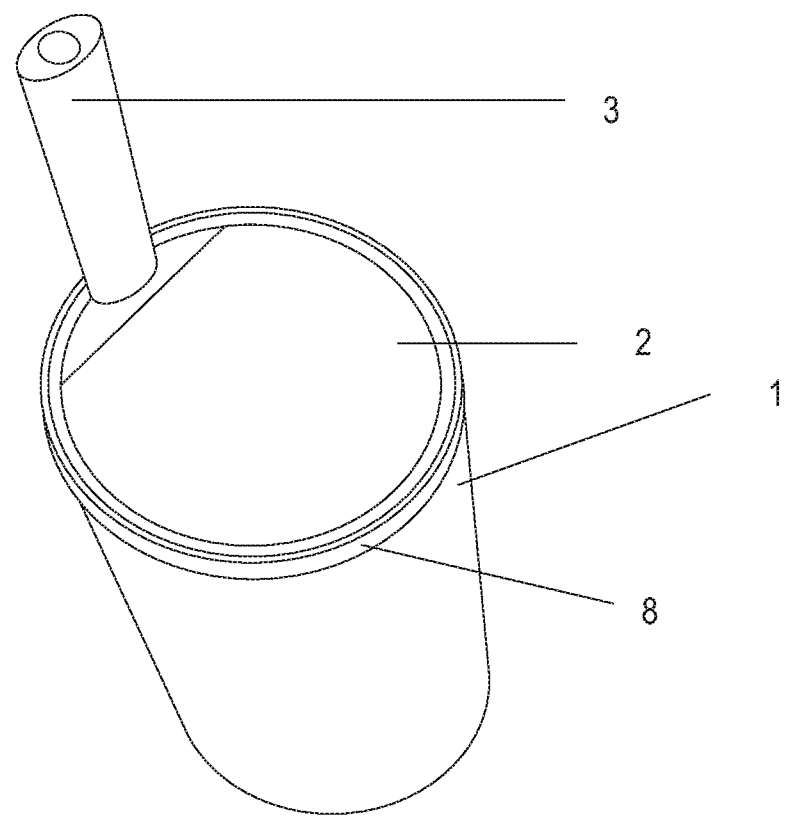

FIG. 3, also in a superior-anterior perspective, describes the suction device when provided with an upper sealing lid (2) to the first mixing compartment (1), and the upper sealing ring (8) can be seen, as well as the position of the mouth-aspiration suction nozzle (3).

Figure 4:
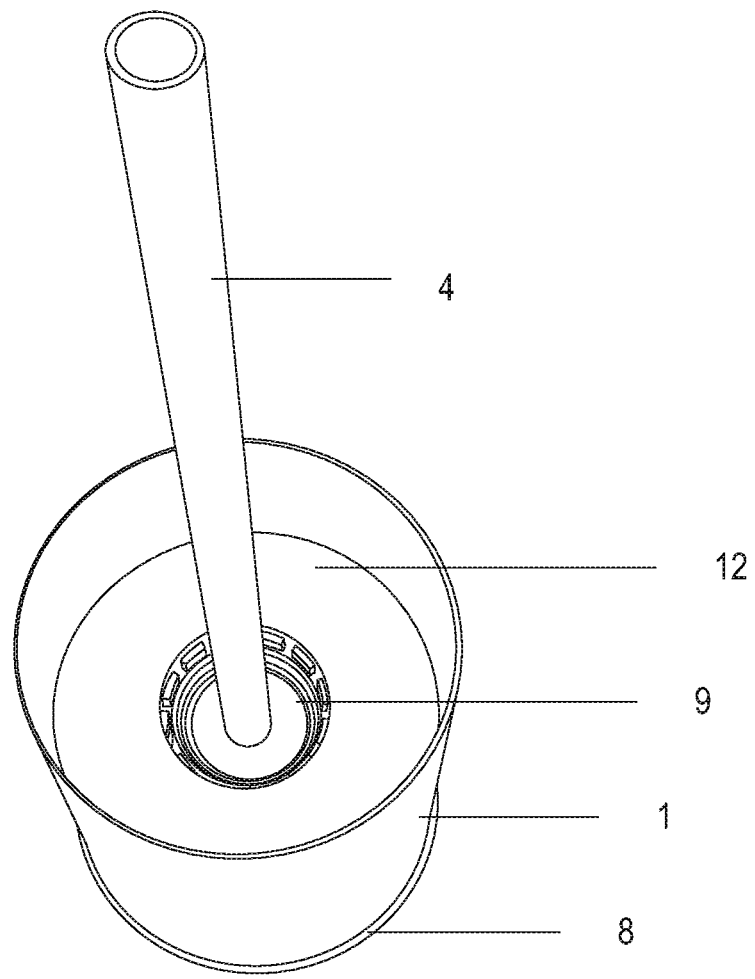

FIG. 4, in an inferior perspective view, focused on the fitting (9) sector of the suction duct (4) on the bottom of the first mixing compartment (1), through a threading system for the attachment of the common-use, disposable bottle nozzle (5), as well as to the open chamber (12), in fact, the receptacle that balances the entire set when coupled to the bottle (5).

The object of this report covers constructive improvements that result in a container for yerba mate, tea, or similar, provided with a suction duct that accesses the inner side of the common-use, disposable bottle, bringing water from it to the inner side of the first mixing compartment, out of which, once the product is mixed with water, the mixture passes by the output filter, provided on the side wall that forms the second compartment or suction antechamber, out of which the mouth-aspiration suction nozzle protrudes.

As such, the reported improvements have an input and an output filter, in addition to the sector with threads for connection to the disposable bottle nozzle, and for the fitting of the suction duct, and of the mouth-aspiration suction nozzle, being the first mixing compartment sealed by an upper lid and the respective sealing ring.

Please note that the mouth-aspiration suction nozzle protrudes from the second compartment, or suction antechamber, formed by a wall protruded to the inner part of the mixing compartment, or first compartment, where there is an output filter that retains inappropriate particles for consumption.

Such as conceived, the reported improvements enable the suction device not only to contain yerba mate, tea, or similar in its first mixing compartment, but it enables it to mix it with water coming from a common-use, disposable bottle, which is consumed by mouth aspiration through a suction nozzle.

The invention claimed is:

1. A suction device, useful for mixing water and ingredients for beverages including yerba mate and tea, comprising:
   a first compartment and a second compartment fluidly connected to the first compartment;
   the first compartment further comprising:
   a suction duct fluidly connected to the first compartment and configured to be lowered into contact with water contained in a common bottle;
   an input filter positioned at a junction between the suction duct and the first compartment; and
   an output filter positioned at a wall between the first compartment and the second compartment;

the input and output filters being further configured to contain the beverage ingredients within the first compartment;

the second compartment further comprising a suction nozzle configured for mouth aspiration;

wherein the suction device mixes water with the beverage ingredients by allowing water to travel up the suction duct, into the first compartment where it mixes with the beverage ingredients, then into the second compartment, up the suction nozzle and dispensed to a user.

2. The suction device as defined in claim 1, wherein the input filter further comprises a disk shaped input filter base inside the first compartment which rises up from the first compartment bottom and upon which the input filter is provided.

3. The suction device as defined in claim 1, wherein the first compartment further comprises a lid at the upper end thereof that seals the first compartment.

4. The suction device as defined in claim 3, further comprising the beverage ingredients stored within the first compartment, so that with the addition of water the beverage ingredients are mixed and may be dispensed to the user.

\* \* \* \* \*